United States Patent
Kubo et al.

(10) Patent No.: US 7,669,008 B2
(45) Date of Patent: Feb. 23, 2010

(54) DESTAGE MANAGEMENT OF REDUNDANT DATA COPIES

(75) Inventors: Robert A. Kubo, Tucson, AZ (US); Jeremy M. Pinson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 11/673,367

(22) Filed: Feb. 9, 2007

(65) Prior Publication Data
US 2008/0195807 A1   Aug. 14, 2008

(51) Int. Cl.
*G06F 12/00*   (2006.01)
(52) U.S. Cl. .................. 711/114; 711/113; 711/162
(58) Field of Classification Search .................. None
See application file for complete search history.

(56) References Cited

U.S. PATENT DOCUMENTS

| | | |
|---|---|---|
| 5,581,724 A | 12/1996 | Belsan et al. |
| 5,930,481 A | 7/1999 | Benhase et al. |
| 6,490,664 B1 | 12/2002 | Jones et al. |
| 6,865,648 B1 | 3/2005 | Naamad et al. |
| 2002/0162076 A1 * | 10/2002 | Talagala et al. ............. 714/819 |
| 2003/0070041 A1 | 4/2003 | Beardsley et al. |

FOREIGN PATENT DOCUMENTS

CN    1503140 A    6/2004

OTHER PUBLICATIONS

Office Action dated Jul. 17, 2009, for Chinese Counterpart Application No. 200810009450.

* cited by examiner

*Primary Examiner*—Reginald G Bragdon
*Assistant Examiner*—Thanh D Vo
(74) *Attorney, Agent, or Firm*—Griffiths & Seaton PLLC (57) ABSTRACT

A method of destage management of redundant data copies in a cache storage subsystem includes providing a plurality of target storage devices, each of the plurality of target storage devices capable of storing a complete copy of a data image. The data image and the plurality of target storage devices are subdivided into a plurality of sub-regions, each of the plurality of sub-regions organized such that a minimum cumulative total of the plurality of sub-regions on the target storage devices equals a number of sub-regions required to form the complete copy of the data image. Data is destaged from a write cache to the plurality of sub-regions on the target storage devices in an order such that a minimum number of sub-regions can be combined to restore the complete copy of the data image.

17 Claims, 6 Drawing Sheets

DESTAGE MANAGEMENT OF REDUNDANT DATA COPIES

BACKGROUND OF THE INVENTION

1. Field of the Invention

The present invention relates in general to computers, and, more particularly, to a system and method of destage management of redundant data copies in cache storage subsystems.

2. Description of the Prior Art

A storage subsystem, such as the International Business Machines (IBM®) Enterprise Storage Server (ESS®), will receive Input/Output (I/O) requests directed toward an attached storage system. The attached storage system may comprise an enclosure including numerous interconnected disk drives, such as a Direct Access Storage Device (DASD), Redundant Array of Independent Disks (RAID Array), Just A Bunch of Disks (JBOD), etc. If I/O requests are received at a faster rate than they can be processed, then the storage subsystem will queue the I/O requests in a storage cache, which may comprise one or more gigabytes of volatile storage, e.g., Random Access Memory (RAM), Dynamic Random Access Memory (DRAM), etc. A copy of certain modified (write) data may also be placed in a non-volatile storage unit (NVS), such as a battery-backup volatile memory, to provide additional protection of write data in the event of a failure at the storage subsystem.

An entry is included in a Least Recently Used (LRU) list for each track in cache. A track can be staged from the storage system for cache to return to a read request. Additionally, write data for a track may be stored in cache before being transferred to the attached storage system. When additional space in cache is needed to buffer additional requested read data and modified data, tracks indicated at the LRU end of the LRU list are destaged to disk. An entry is added to the most recently used (MRU) end of the LRU list for each track added to cache. Each entry in the LRU list comprises a control block that indicates the current status of a track, the location in cache, and the location in the storage system. An additional NVS LRU list is maintained for tracks in the NVS. The cache and NVS LRU lists include entries for tracks in both NVS and cache.

In storage systems that provide a write cache to enhance performance, a method to persistently store and recover data is required to preserve data integrity during a loss-of-power scenario. If the data are not stored in a persistent manner, then the data in the write cache are lost when power is lost. There is no record of what data were lost during the power outage, so all of the data stored in the subsystem are suspect. The size of the write cache impacts the performance capability of the storage system in that it determines the limits to which write transactions can be processed by the system prior to requiring that the data be destaged to persistent media such as hard disk devices (HDDs).

SUMMARY OF THE INVENTION

In storage subsystems that utilize redundant copies of information to provide a backup should one of the copies of the information become unavailable, the process of creating the redundant copies may be improved to speed the creation of a single copy of the data. This is of benefit in cases where elapsed time to create a persistent copy of a required data structure is critical, such as the emergency destage of write cache data to persistent media during a power loss as previously described. A variety of factors influence the available time for destage of the write cache to persistent media, such as backup power capacity and the behavior of the persistent media storage device controller and interface network behavior.

Data storage systems often implement a redundant copy methodology when saving the write cache data such that there is a backup copy of the data on an independent storage device should one of the storage devices fail during the power loss recovery. In these cases, it is useful to have created a complete, valid copy of the write cache data as quickly as possible, to allow for cases where the destage of the write cache data is interrupted for some unusual circumstance such as a backup power system failure and/or a slow data storage device controller.

In one embodiment, the present invention is a method of destage management of redundant data copies in a cache storage subsystem, comprising providing a plurality of target storage devices, each of the plurality of target storage devices capable of storing a complete copy of a data image, subdividing the data image and the target storage devices into a plurality of sub-regions, each of the plurality of sub-regions organized such that a minimum cumulative total of the plurality of sub-regions on the target devices equals a number of sub-regions required to form the complete copy of the data image, and destaging data from a write cache to the plurality of sub-regions on the target storage devices in an order such that a minimum number of sub-regions can be combined to restore the complete copy of the data image.

In another embodiment, the present invention is a system for destage management of redundant data copies in a cache storage subsystem, comprising a computer processing device which organizes a plurality of target storage devices, each of the target storage devices adapted to be capable of storing a complete copy of a data image, wherein the computer processing device subdivides the data image and the target storage devices into a plurality of sub-regions, each of the plurality of sub-regions organized such that a minimum cumulative total of the plurality of sub-regions on the target storage devices equals a number of sub-regions required to form the complete copy of the data image, and a destage manager module connected to the computer processing device which destages data from a write cache to the plurality of sub-regions on the target storage devices in an order such that a minimum number of sub-regions can be combined to restore the complete copy of the data image.

In another embodiment, the present invention is an article of manufacture including code for destage management of redundant data copies in a cache storage subsystem, wherein the code is capable of causing operations to be performed comprising providing a plurality of target storage devices, each of the plurality of target storage devices capable of storing a complete copy of a data image, subdividing the data image and target storage devices into a plurality of sub-regions, each of the plurality of sub-regions organized such that a minimum cumulative total of the plurality of sub-regions on the target storage devices equals a number of sub-regions required to form the complete copy of the data image, and destaging data from a write cache to the plurality of sub-regions on the target storage devices in an order such that a minimum number of sub-regions can be combined to restore the complete copy of the data image.

BRIEF DESCRIPTION OF THE DRAWINGS

In order that the advantages of the invention will be readily understood, a more particular description of the invention briefly described above will be rendered by reference to specific embodiments that are illustrated in the appended drawings, Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow-chart diagrams. As such, the depicted order and labeled steps are indicative of one embodiment of the presented method. Other steps and methods may be conceived that correspond in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides a system and method which first detects the presence of a need to store non-write cache data persistently, dynamically reduces the size of the write cache to accommodate the new persistent data storage requirement, and thereby allocates a persistent storage location to support persistent storage of the non-write cache data.

The present invention manages a static total persistent memory allocation and dynamically controls the allocation and apportionment of the persistent memory to system usages as a write cache and persistent memory repository for other secondary mission-critical data. The need for a repository for the secondary mission-critical data is dependent upon other storage system configuration parameters that can dynamically be changed during operation. To efficiently manage the dynamic nature of the types of persistent data (write cache and secondary mission-critical data) and corresponding requirements for the required storage capacity of each type of persistent data, a system to dynamically reconfigure the capacity of the write cache and allocate/apportion the persistent storage is described in the following paragraphs.

Figure 1:
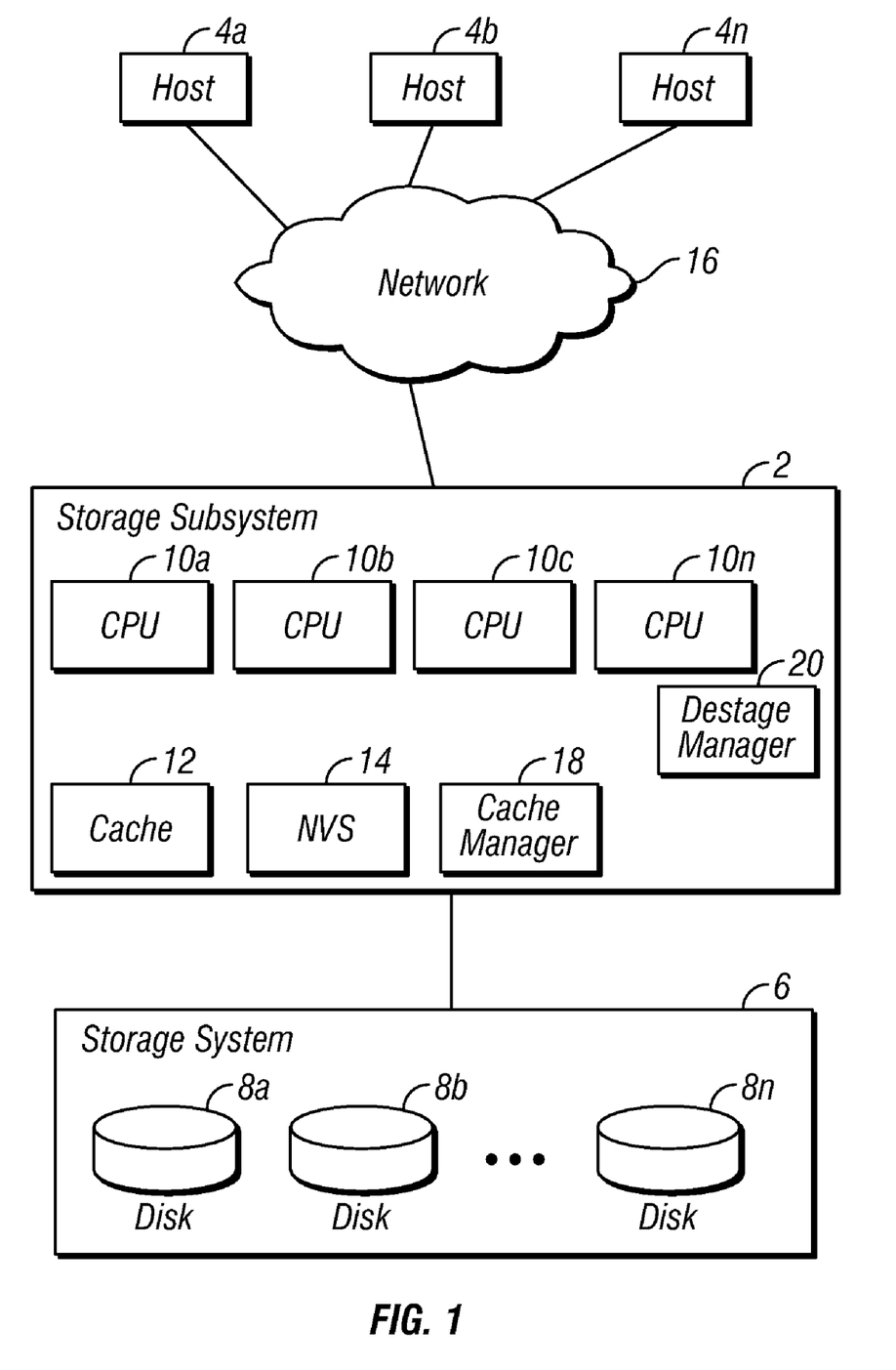
FIG. 1 illustrates a computing environment in which aspects of the invention are implemented.

Turning to FIG. 1, an example storage subsystem computing environment in which aspects of the present invention can be implemented is depicted. A storage subsystem 2 receives I/O requests from hosts 4a, 4b . . . 4n directed to tracks in a storage system 6, which comprises one or more hard disk drives 8a, 8b . . . 8n. The storage system 6 and disk drives 8a, 8b . . . 8n may be configured as a DASD, one or more RAID ranks, etc. The storage subsystem 2 further includes one or more central processing units (CPUs) 10a, 10b, 10c . . . 10n, a cache 12 comprising a volatile memory to store tracks, and a non-volatile storage unit (NVS) 14 in which certain dirty (corrupted) or modified tracks in cache are buffered. The hosts 4*a*, 4*b* . . . 4*n* communicate I/O requests to the storage subsystem 2 via a network 16, which may comprise any network known in the art, such as a Storage Area Network (SAN), Local Area Network (LAN), Wide Area Network (WAN), the Internet, an Intranet, etc. The cache 12 may be implemented in one or more volatile memory devices and the NVS 14 implemented in one or more high-speed non-volatile storage devices, such as a battery-backed-up volatile memory. A cache manager 18 comprises either a hardware component or process executed by one of the CPUs 10*a*, 10*b* . . . 10*n* that manages the cache 12. A destage manager 20 comprises a software or hardware component that manages destage operations. Cache manager 18 and/or destage manager 20 can operate using hardware and software as described. Additionally, however, cache manager 18 and/or destage manager 20 can operate using a combination of various hardware and software which operates and executes on a storage subsystem 2 to perform processes herein described.

Figure 2:
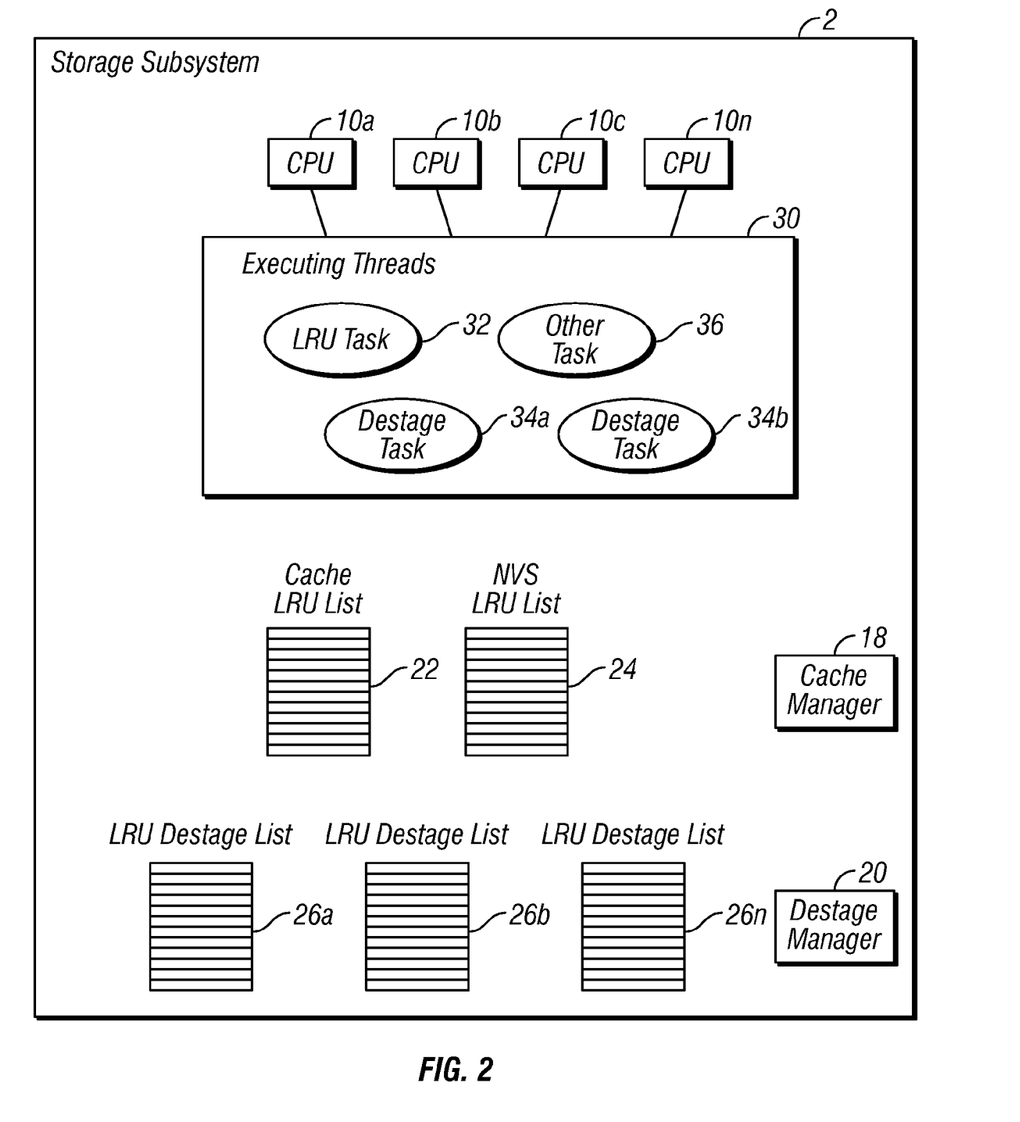
FIG. 2 illustrates program components used to implement cache management operations in implementations where disks in the storage system are organized into RAID ranks.

FIG. 2 illustrates example program components used to implement cache management operations in implementations where the disks 8*a*, 8*b* . . . 8*n* in the storage system 6 are organized into RAID ranks. FIG. 2 illustrates a cache LRU list 22 in which every track in cache 12 is listed, an NVS list 24 in which every track in the NVS 14 is listed, and one RAID Rank LRU list 26*a*, 26*b* . . . 26*n* for each RAID rank configured in the storage system 6. The CPUs 10*a*, 10*b* . . . 10*n* would execute threads to perform various operations. The executing threads 30 include an LRU task thread 32 that scans the cache LRU list 22 looking for entries for modified tracks that satisfy a certain criterion, such as a track in a specified RAID rank, multiple executing destage threads 34*a* and 34*b* that are called to destage a track from cache 12 to the storage system 6, and other threads 36 performing any other storage subsystem 2 operation. As would be understood by those of ordinary skill in the art, the destage methodologies presently described constitute an example method of destaging data and is not intended to foreclose other methods of destaging data in accordance with the present invention.

To create a complete, valid copy of write cache data as quickly as possible, data destage to media can be structured such that the elapsed time to create a reconstructable copy of the data image is minimized, while simultaneously creating multiple complete redundant copies on multiple independent storage devices. Target storage devices that are capable of storing a complete copy of the data image can be provided to accomplish this task. Once the devices are in place, the existing data image is divided into specific sub-regions. The sub-regions of the data image are organized such that as long as the minimum cumulative total of the distinct sub-regions available from the target storage devices equals the number of sub-regions required to form a single data image of the structure that was saved, the data image can be restored. The destage order of the sub-regions to the target storage devices is ordered and structured such that the priority is to form copies of the data image sub-regions that are capable to restore a complete data image on each of the target storage devices.

For an example, if a data image is sub-divided into two (2) sub-regions [sub-region 1 and sub-region 2] and is targeted to be stored on two (2) storage devices [storage device 1 and storage device 2], at the time of data destage to media, the order of the destage is controlled, such that: (1) data from sub-region 1 is first stored to storage device 1, (2) data from sub-region 2 is next stored to storage device 2, (3) data from sub-region 2 is stored to storage device 1, and (4) data from sub-region 1 is stored to storage device 2. Subsequent to step (2), a complete data image can be restored by combining sub-region 1 and sub-region 2 data images.

Figure 3:
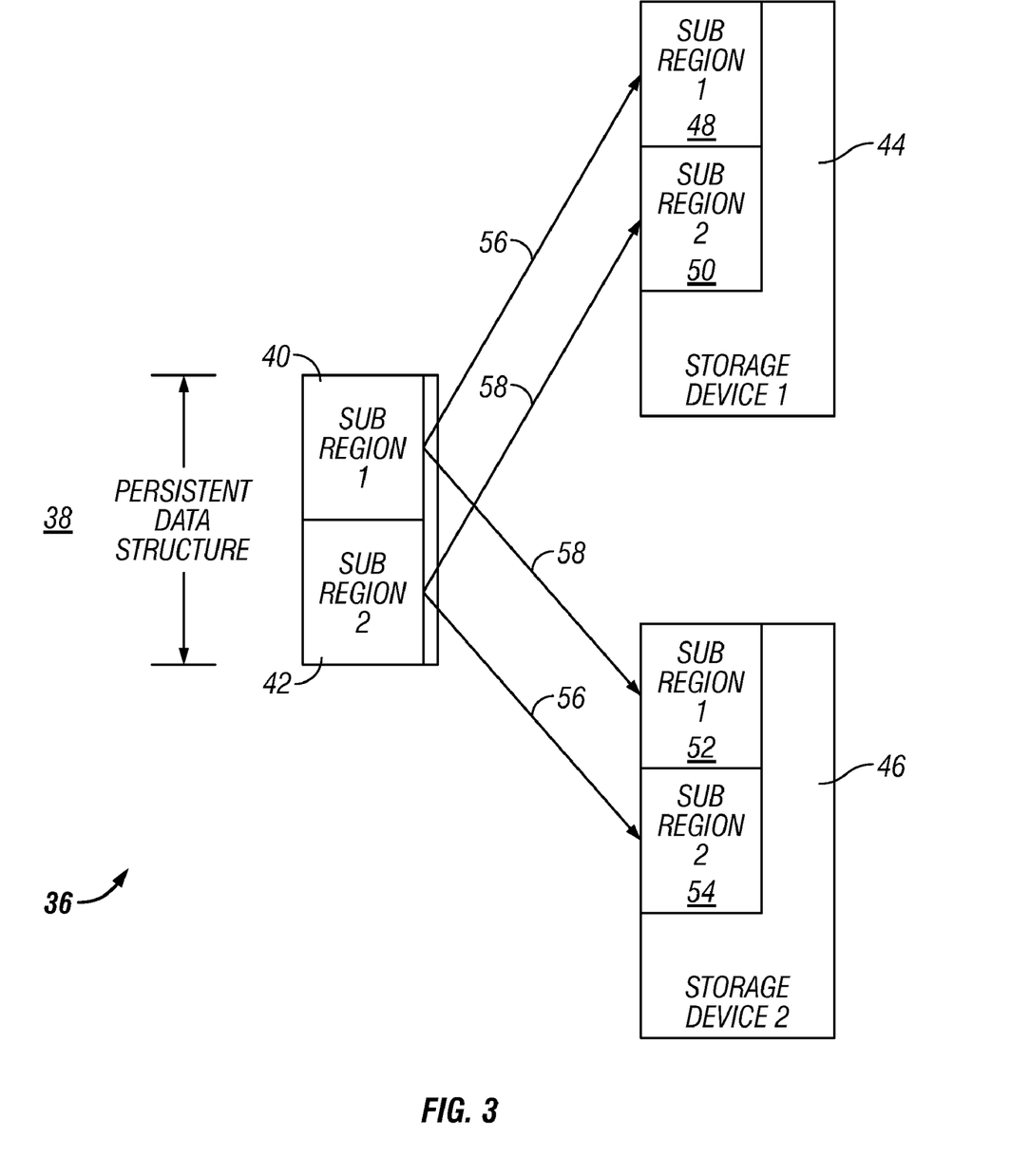
FIG. 3 illustrates an example management of a data destage to media operation according to the present invention.

Turning to FIG. 3, a system 36 and method of data destage to media being managed is described. System 36 generally depicts a cache memory storage system having a persistent data structure 38. The data structure 38 is divided into a first sub-region 40 and a second sub region 42. A plurality of storage devices are designated to receive destage data. Keeping with the example described in the foregoing paragraph, a first storage device 44 and a second storage device 46 are designated. The first storage device includes a first sub-region 48 and a second sub region 50. Second storage device 46 includes a first sub-region 52 and a second sub-region 54.

Lines 56 indicate a first parallel destage of data to devices 44 and 46. During phase one of the data destage, the first sub-region 40 of the persistent data structure 38 is saved to the first data storage device, storage device 44, to sub-region 48 and in parallel, sub-region 42 of the data structure 38 is saved to the second data storage device, storage device 46. At the completion of phase one of the data destage of the persistent data structure save, a complete copy of the persistent data structure has now been saved to persistent media storage devices.

FIG. 3 also describes the system 36 and method of data destage to media being managed such that the solid lines 58 indicate the second parallel destage of data to the first and second storage devices 44, 46. During phase two of the data destage operation, sub-region 42 of the persistent data structure 38 is saved to the storage device 44, sub-region 50, and in parallel, sub-region 40 of the persistent data structure 38 is saved to storage device 46, sub-region 52. At the completion of phase two of the data destage of the persistent data structure save, two complete redundant copies of the persistent data structure have been saved to two independent persistent media storage devices.

Figure 4:
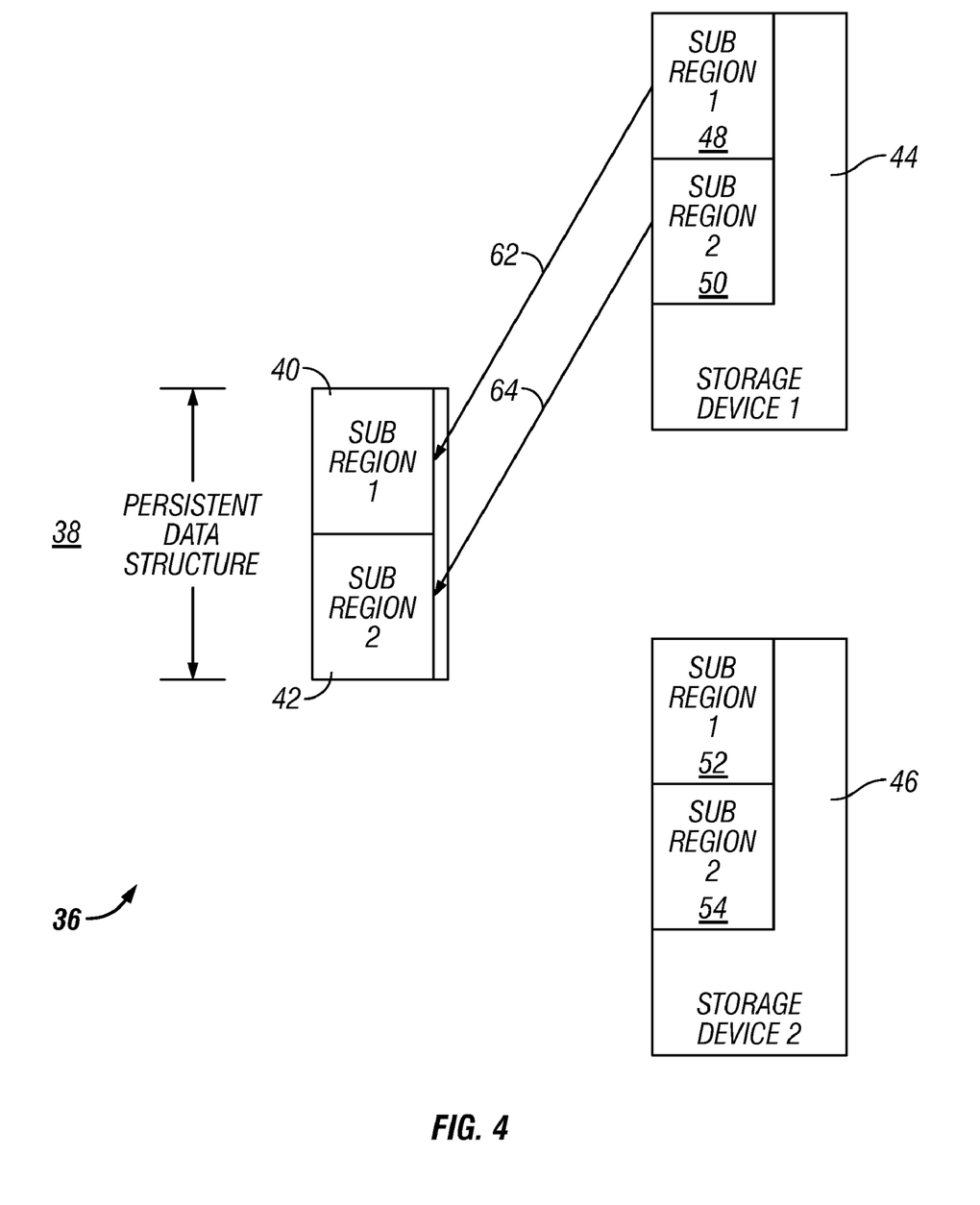
FIG. 4 illustrates a first example method of restoration of a persistent data structure according to the present invention.

Turning to FIG. 4, a first example method of restoration of the persistent data structure 38 is depicted when both phase one and phase two of the persistent data structure destage was completed to at least one of the persistent media storage devices (e.g., storage devices 44, 46). Data destaged to sub-region 48 is again restored to sub-region 40 in data structure 38, which is illustrated by line 62. Likewise, line 64 illustrates the restoration of data destaged to sub-region 50 back to sub-region 42 in data structure 38. When both phase one and phase two stages are completed, it is possible to restore the persistent data structure completely from a single storage device (in this case, storage device 44). In most cases, both phase one and phase two destage phases will have been completed to both storage devices, enabling the foregoing restoration operation.

Figure 5:
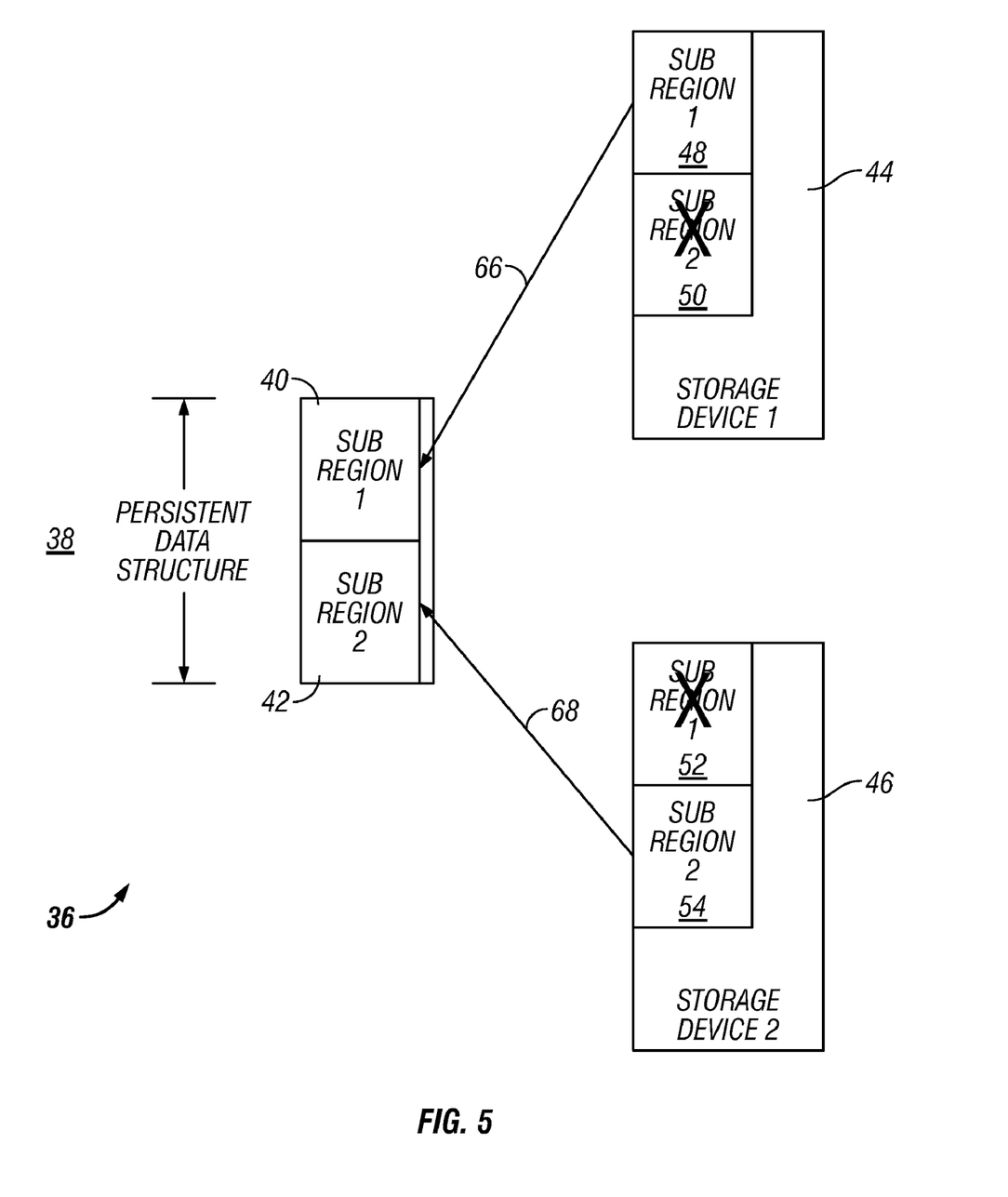
FIG. 5 illustrates a second example method of restoration of a persistent data structure according to the present invention.

Turning to FIG. 5, a second example restoration operation of the persistent data structure 38 is depicted when only phase one of the destage of the persistent data structure 38 was able to be completed when saving to persistent media storage devices 44, 46. The persistent data structure 38 is reassembled from both storage devices 44, 46, where storage device 44 holds a valid copy of sub-region 40, and storage device 46 holds a valid copy of sub-region 42. Again, the restoration process of staging the data back to the structure 38 is indicated by lines 66 and 68 respectively. In this second example, the entire persistent data structure 38 is able to be properly reassembled from the two sub-regions that were stored to two independent storage devices 44, 46.

Figure 6:
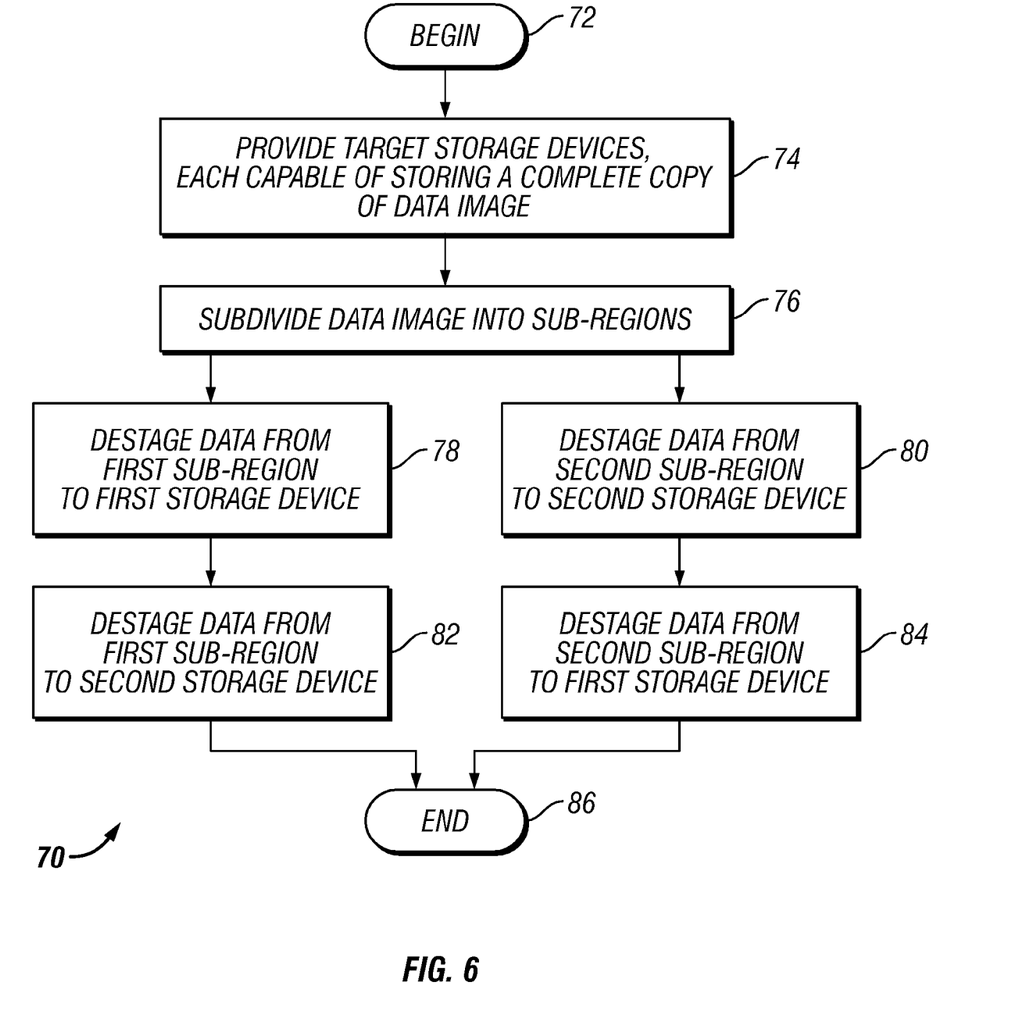
FIG. 6 illustrates an example method of destage management according to the present invention.

FIG. 6 illustrates an example method 70 of organizing and managing the destage operations previously described in the foregoing examples. The method 70 begins (step 72) with the organization of a plurality of target storage devices, each of the target storage devices capable of storing a complete copy of a data image (step 74). The respective data image is subdivided into sub-regions (step 76) as previously described. Next, data is destaged from the first sub-region to a first target storage device (step 78), while data is also being destaged from the second sub-region to a second storage device (step 80) in a parallel operation. Similarly, data is next destaged from the first sub-region to the second storage device (step 82), while data is also destaged from the second sub-region to the first storage device in a parallel operation (step 84). The method 70 then ends (step 86).

Software and/or hardware to implement the methods previously described, such as the described destage from persistent media to a target storage device, can be created using tools currently known in the art. The implementation of the described system and method involves no significant additional expenditure of resources or additional hardware than what is already in use in standard computing environments utilizing RAID storage topologies, which makes the implementation cost-effective. Because the methods prioritize the creation of a complete data image on a plurality of redundant storage devices, the time required to destage data to persistent media, and to restore the data is minimized.

System 36 can make use of a processing component, such as CPU 10 to dynamically recalibrate a respective data image, sub-regions of the data image, and available target storage devices, as well as dynamically implement a destage and restore process, depending on a certain number of storage resources which are available at any certain time in the storage system 6. As a result, when an additional disk 8 or similar target storage device is made available in the system 6, the CPU 10 can implement a method to perform the recalibration, so as to effectively allocate storage resources to a particular destage management technique.

Implementing and utilizing the example systems and methods as described can provide a simple, effective method of providing effective destage management of redundant data copies in a computing environment having storage systems and subsystems as described, and serves to maximize the performance of the storage system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method of destage management of redundant data copies in a cache storage subsystem, comprising:
   providing a plurality of target storage devices, each of the plurality of target storage devices capable of storing a complete copy of a data image;
   subdividing the data image and the target storage devices into a plurality of sub-regions, each of the plurality of sub-regions organized such that a minimum cumulative total of the plurality of sub-regions on the target storage devices equals a number of sub-regions required to reconstruct the complete copy of the data image; and
   destaging data from a write cache to the plurality of sub-regions on the target storage devices in an order such that a minimum number of sub-regions can be combined to restore the complete copy of the data image in a minimal elapsed time, wherein:
      the order is structured such that data from one of the plurality of sub-regions is destaged to a first of the plurality of target storage devices in parallel with data from another one of the plurality of sub-regions destaged to a second of the plurality of target storage devices.

2. The method of claim 1, wherein the storage subsystem is organized in a redundant array of independent disks (RAID) topology.

3. The method of claim 1, wherein the step of destaging data from a write cache is performed using a destage module operational on the storage subsystem.

4. The method of claim 1, wherein the step of subdividing the data image into a plurality of sub-regions is performed using a processing component operational on the storage subsystem.

5. The method of claim 4, wherein the step of subdividing the data image into a plurality of sub-regions is dynamically calibrated by the processing component as additional target storage devices are made available for use.

6. The method of claim 1, further including restoring the data image by combining the minimum number of sub-regions from the target storage devices, wherein restoration of the data image from sub-regions of a single target storage device has priority over multiple target storage devices.

7. A system for destage management of redundant data copies in a cache storage subsystem, comprising:
   a computer processing device which organizes a plurality of target storage devices, each of the target storage devices adapted to be capable of storing a complete copy of a data image, wherein the computer processing device subdivides the data image and target storage devices into a plurality of sub-regions, each of the plurality of sub-regions organized such that a minimum cumulative total of the plurality of sub-regions on the target storage devices equals a number of sub-regions required to form the complete copy of the data image; and
   a destage manager module connected to the computer processing device which destages data from a write cache to the plurality of sub-regions on the target storage devices in an order such that a minimum number of sub-regions can be combined to restore the complete copy of the data image in a minimal elapsed time, wherein:
      the order is structured such that data from one of the plurality of sub-regions is destaged to a first of the plurality of target storage devices in parallel with data from another one of the plurality of sub-regions destaged to a second of the plurality of target storage devices.

8. The system of claim 7, wherein the storage subsystem is organized in a redundant array of independent disks (RAID) topology.

9. The system of claim 7, wherein the step of subdividing the data image into a plurality of sub-regions is dynamically calibrated by the computer processing device as additional target storage devices are made available for use.

10. The system of claim 7, wherein the destage manager module further comprises hardware, software, or a combination of hardware and software operating on the storage subsystem.

11. An article of manufacture including code for destage management of redundant data copies in a cache storage subsystem, wherein the code is capable of causing operations to be performed comprising:
   providing a plurality of target storage devices, each of the plurality of target storage devices capable of storing a complete copy of a data image;
   subdividing the data image and target storage devices into a plurality of sub-regions, each of the plurality of sub-regions organized such that a minimum cumulative total of the plurality of sub-regions on the target storage devices equals a number of sub-regions required to form the complete copy of the data image; and destaging data from a write cache to the plurality of sub-regions on the target storage devices in an order such that a minimum number of sub-regions can be combined to restore the complete copy of the data image in a minimal elapsed time, wherein:

the order is structured such that data from one of the plurality of sub-regions is destaged to a first of the plurality of target storage devices in parallel with data from another one of the plurality of sub-regions destaged to a second of the plurality of target storage devices.

12. The article of manufacture of claim 11, wherein the storage subsystem is organized in a redundant array of independent disks (RAID) topology.

13. The article of manufacture of claim 11, wherein the operation of destaging data from a write cache is performed using a destage module operational on the storage subsystem.

14. The article of manufacture of claim 11, wherein the operation of subdividing the data image into a plurality of sub-regions is performed using a processing component operational on the storage subsystem.

15. The article of manufacture of claim 11, wherein the operation of subdividing the data image into a plurality of sub-regions is dynamically calibrated by the processing component as additional target storage devices are made available for use.

16. The system of claim 7, wherein the computer processing device restores the data image by combining the minimum number of sub-regions from the target storage devices, wherein restoration of the data image from sub-regions of a single target storage device has priority over multiple target storage devices.

17. The article of manufacture of claim 11, further including the operation of restoring the data image by combining the minimum number of sub-regions from the target storage devices, wherein restoration of the data image from sub-regions of a single target storage device has priority over multiple target storage devices.

* * * * *